Dec. 17, 1946.  H. V. JAMES  2,412,736
TIRE TUBE REPAIR PLATE
Filed Aug. 28, 1944
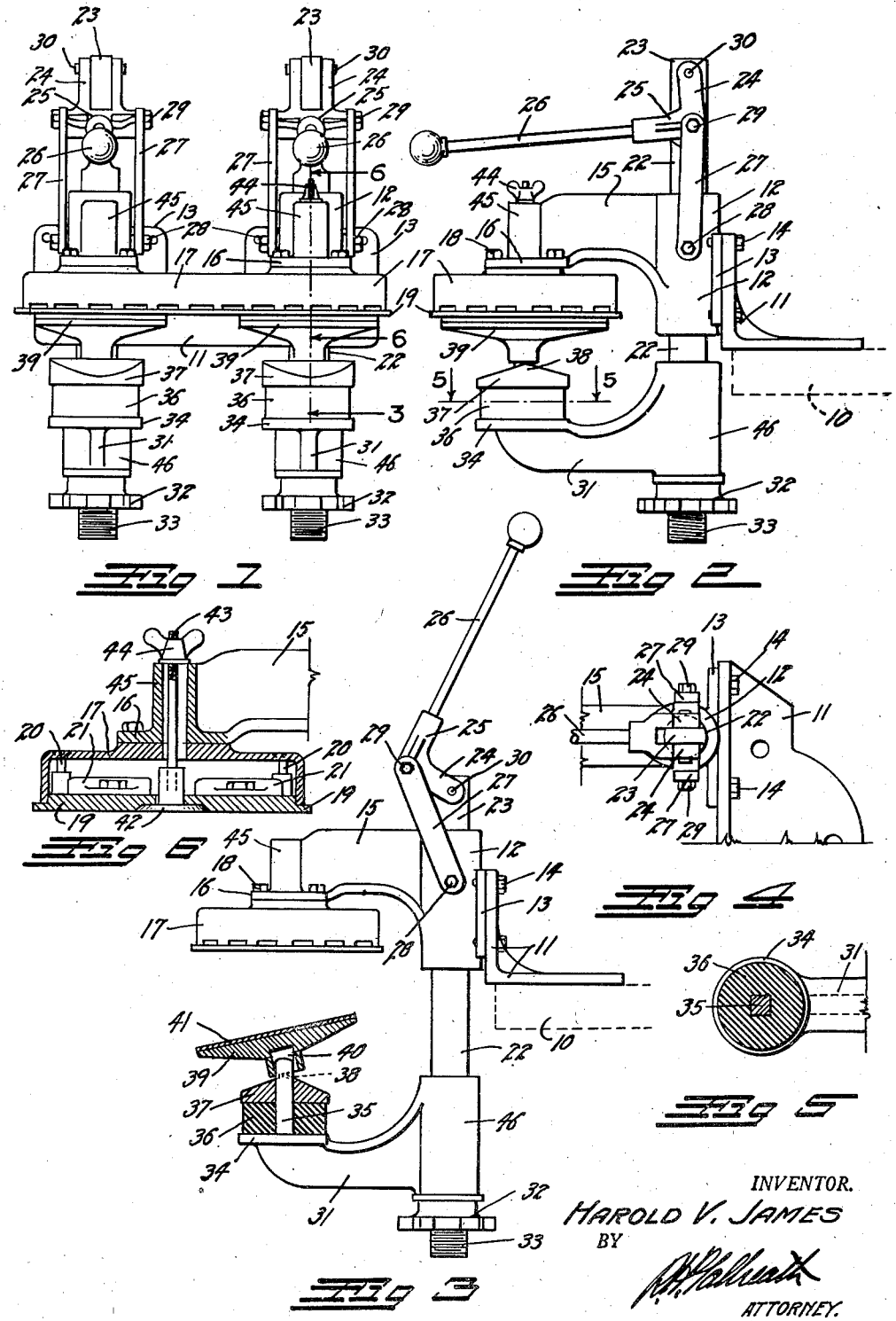
INVENTOR.
HAROLD V. JAMES
BY
ATTORNEY.

Patented Dec. 17, 1946

2,412,736

UNITED STATES PATENT OFFICE 2,412,736

TIRE TUBE REPAIR PLATE

Harold V. James, Denver, Colo.

Application August 28, 1944, Serial No. 551,540

6 Claims. (Cl. 18—18)

This invention relates to a tube vulcanizing device for pneumatic tires, and has for its principal object the provision of a simple, compact, and highly efficient tube plate vulcanizer which will accommodate one or more tube repairs simultaneously; which will accommodate exceedingly long repairs in the tube; and which will apply a uniform pressure throughout the entire area of the repair.

Other objects of the invention are: to provide a device of this character in which the hot plate will be inverted and fixedly supported to prevent dirt, dust and other foreign materials from accumulating on the surface; to provide a highly efficient mechanism for clamping the repair against the inverted hot plate; to provide means to first rapidly close the repair against the plate and then exert an extremely tight clamping contact thereon; to provide means for accurately adjusting the clamping mechanism to accommodate repairs of various thicknesses; and to provide means for vulcanizing the portions of tire tubes around the valve stems thereof.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all view of the drawing and throughout the description.

In the drawing:

Fig. 1 is a front view of the improved tire tube plate;

Fig. 2 is a side view thereof in the closed position;

Fig. 3 is a similar view in the open position, showing a portion thereof in section to illustrate the interior mechanism, the section being taken on the line 6—3, Fig. 1;

Fig. 4 is a fragmentary top view of a reciprocating post employed in the improved tube plate;

Fig. 5 is a detail cross-section, taken on the line 5—5, Fig. 2; and

Fig. 6 is an enlarged cross-section of the heating plate, taken on the line 6—6, Fig. 1.

The improved tube plate is supported upon a work bench or other supporting structure, such as indicated at 10, by means of a bench bracket 11. The bench bracket is provided with a vertical surface against which one or more vertical guide sleeve 12 are secured. The sleeves are formed with attachment flanges 13 which are clamped to the bracket 11 by means of suitable clamp bolts 14. A supporting arm 15 is formed on each of the sleeves 12 and extends forwardly thereof, to a tubular extremity 45 having a horizontal attachment flange 16 at its bottom.

A heater housing 17 is secured to the attachment flanges 16 of the arms 15 by means of suitable bolts 18. The housing 17 is a box-like structure having a normally open bottom. The bottom is closed by means of a hot plate 19 secured therein by means of counter-sunk screws 20. Suitable heating elements 21, of any of the standard varieties, are secured to the upper surface of the hot plate 19 within the housing 17.

The tube to be repaired is clamped against the bottom surface of the hot plate 19, through the medium of a vertical sliding post 22, there being one of these posts slidably mounted in each of the sleeves 12.

The upper extremity of each post 22 is flattened, as shown at 23, to pass between a pair of levers 24 formed on a bell crank lever fitting 25. The levers 24 are mounted on a pivot pin 30 extending through the flattened portion 23 of the post. An operating handle 26 extends from the fitting 25. The fittings 25 are each supported on two connecting links 27, the lower extremities of which are mounted on hinge bolts 28 on the opposite sides of the sleeve 12, and the upper extremities of which are mounted on hinge bolts 29 on opposite sides of the fitting 25.

A bearing sleeve 46 carrying a swinging bracket 31 is rotatably mounted on the lower extremity of each of the posts 22. The bearing sleeves are supported on the posts by means of adjusting nuts 32, the lower extremities of the posts being threaded, as shown at 33, for the nuts 32. Each swinging bracket 31 terminates in a horizontal platform 34 from the center of which a square stud 35 arises. A cushion member 36 surrounds the stud and rests upon the platform 34. The cushion member may be of any desired resilient material, preferably rubber. A compression plate 37 also surrounds the stud 35 and rests upon the cushion member 36. The plate 37 is formed with a diametrically extending, raised, apex ridge 38.

A pressure plate 39 rests upon the apex ridge 38 of the plate 37. The pressure plate is formed with an enlarged socket 40 in its bottom for loosely receiving the upper extremity of the stud 35. This allows the pressure plate to tilt freely on the apex ridge 38, as shown in Fig. 3. The upper face of the plate 39 is covered by means of a suitable pad 41 of cork, asbestos sheeting or similar material.

While the above description applies to a single post 22, with its attached apparatus, it is to be understood that as many posts and apparatuses may be used as desired, two being illustrated on the drawing.

In use, the tube repair is placed on one of the pads 41 and the handle 26 is pulled forwardly. The first movement causes the levers 24 to act against the links 27 so as to rapidly raise the post 22 to bring the repair against the hot plate 19. Further downward movement of the handle 26 brings a toggle action into play between the levers 24 and the links 27 which exerts an extremely strong upward pressure on the posts 22 to firmly clamp the repair against the hot plate.

The spacing between the hot plate and the pressure plate 39 may be pre-set to obtain the desired pressure on any repair by adjustment of the nut 32.

It will be noted that in the extreme lower position of the handle 26, the bolts 29 will pass beyond the dead center position between the pin 30 and the bolts 28, as shown in Fig. 2. This firmly and automatically locks the pressure plate in the raised position. The handle 26 is supported in the raised position by gravity when not in use.

Since the bracket 31 is rotatably mounted, the plate 39 can be swung to any desired position beneath the hot plate 19. For long repairs, the pressure plates 39 of two of the posts can be swung together so as to cover an exceedingly long area. Means are provided for curing repairs around the valve stems of tubes, by placing a round taper-edged plug 42 in the surface of the hot plate 19. This plug is normally clamped in place by means of a threaded stud 43 which extends upwardly through the tubular extremity 45 of the arm 15 to a wing nut 44. To be used for a valve repair the plug 42 is removed and the tube valve is extended into the tubular extremity 45.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for repairing pneumatic tire tubes comprising: a supporting bracket; a vertical guide sleeve supported by said bracket; an arm extending forwardly from said guide sleeve; a hot plate supported by said arm with its heating surface facing downward; a vertical movable post mounted in said guide sleeve and having portions projecting above and below the latter; a support extending forwardly from the projecting below portion of said post; a pressure plate supported by said support below said hot plate; means for raising said post in its guide sleeve to cause said pressure plate to approach said hot plate; and means for adjusting the vertical position of said supports on said post.

2. A device for repairing pneumatic tire tubes comprising: a supporting bracket; a vertical guide sleeve supported by said bracket; an arm extending forwardly from said guide sleeve; a hot plate supported by said arm with its heating surface facing downward; a vertical movable post mounted in said guide sleeve and having portions projecting above and below the latter; a support extending forwardly from the projecting below portion of said post; a pressure plate supported by said support below said hot plate; means for raising said post in its guide sleeve to cause said pressure plate to approach said hot plate, the lower extremity of said post being threaded; and a nut carried on the threads for raising and lowering said support thereon.

3. A device for repairing pneumatic tire tubes comprising: a supporting bracket; a vertical guide sleeve having an open top and bottom, supported by said bracket; an arm extending forwardly from said guide sleeve; a hot plate supported by said arm with its heating surface facing downward; a vertically movable post slidably mounted in said guide sleeve and having portions projecting above and below the latter; a support rotatably mounted on and extending forwardly from the projecting below portion of said post; a platform supported by said support; a cushion member carried by said platform; a pressure plate supported by said cushion member; and means positioned above said guide sleeve and engaging the projecting above portion of said post for raising said post in its guide sleeve to cause said pressure plate to approach said hot plate.

4. A device for repairing pneumatic tire tubes comprising: a supporting bracket; a vertical guide sleeve having an open top and bottom supported by said bracket; an arm extending forwardly from said guide sleeve; a hot plate supported by said arm with its heating surface facing downward; a vertically movable post slidably mounted in said guide sleeves and having portions projecting above and below the latter; a support rotatably mounted on and extending forwardly from the projecting below portion of said post; a platform supported by said support; a cushion member carried by said platform; a stud extending upwardly from said platform through said cushion member; a compression plate resting on said cushion member and surrounding said stud; a pressure plate resting on said compression plate; and means positioned above said guide sleeve and engaging the projecting above portion of said post for raising said post in its guide sleeve.

5. A device for repairing pneumatic tire tubes comprising: a supporting bracket; a vertical guide sleeve having an open top and bottom supported by said bracket; an arm extending forwardly from said guide sleeve; a hot plate supported by said arm with its heating surface facing downward; a vertically movable post slidably mounted in said guide sleeve and having portions projecting above and below the latter; a support rotatably mounted on and extending forwardly from the projecting below portion of said post; a platform supported by said support; a cushion member carried by said platform; a stud extending upwardly from said platform through said cushion member; a compression plate resting on said cushion member and surrounding said stud; a raised medial portion on said compression plate; a pressure plate resting on the raised medial portion of said compression plate so that it may freely tilt thereon; and means positioned above said guide sleeve and engaging the projecting above portion of said post for raising said post in its guide sleeve.

6. A tube plate vulcanizer comprising: a bench bracket; a pair of vertical guide sleeves secured to a forward face on said bracket; a supporting arm formed on each sleeve and extending forwardly therefrom; an attachment flange on the bottom of the projecting portion of each supporting arm; a heating housing secured to the bottoms of said flanges and extending between said arms; a hot plate closing the bottom of said housing; a vertical sliding post in each of said guide sleeve and having portions projecting above and below the latter; toggle links positioned between each of said sleeves and the projecting above portion of the post therein and adapted to lift the latter; a swinging arm rotatably mounted on the projecting below portion of each post so that it may be swung beneath said hot plate; and a pressure plate carried by each arm for lifting a tube against the bottom of said plate.

HAROLD V. JAMES.